United States Patent
Marra et al.

(10) Patent No.: US 9,098,450 B2
(45) Date of Patent: Aug. 4, 2015

(54) AUTOMATED APPLICATION UPDATE CHECKS BASED ON UNEXPECTED ERRORS AND CRASHES

(75) Inventors: Gregory Matthew Marra, San Francisco, CA (US); Christopher J. Marra, South Windsor, CT (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/475,270

(22) Filed: May 18, 2012

(65) Prior Publication Data

US 2015/0154077 A1 Jun. 4, 2015

Related U.S. Application Data

(60) Provisional application No. 61/613,425, filed on Mar. 20, 2012.

(51) Int. Cl.
*G06F 11/00* (2006.01)
*G06F 11/14* (2006.01)
*H04L 29/08* (2006.01)

(52) U.S. Cl.
CPC .............. *G06F 11/143* (2013.01); *H04L 67/10* (2013.01)

(58) Field of Classification Search
CPC ............... G06F 7/78; G06F 8/00–8/78; G06F 9/44–9/455; G06F 11/36
USPC .................................................. 717/100–178
See application file for complete search history.

(56) References Cited

U.S. PATENT DOCUMENTS

| | | | | |
|---|---|---|---|---|
| 6,230,284 B1 * | 5/2001 | Lillevold | .......................... | 714/13 |
| 6,857,085 B1 * | 2/2005 | Ruhlen et al. | .............. | 714/38.14 |
| 7,577,879 B2 * | 8/2009 | Lantz et al. | ...................... | 714/57 |
| 2004/0098715 A1 * | 5/2004 | Aghera et al. | ................. | 717/173 |
| 2005/0055686 A1 * | 3/2005 | Buban et al. | ................... | 717/170 |
| 2005/0223374 A1 * | 10/2005 | Wishart et al. | ................. | 717/173 |
| 2007/0157192 A1 * | 7/2007 | Hoefler et al. | ................. | 717/168 |
| 2009/0075641 A1 * | 3/2009 | Guven et al. | ................... | 455/419 |
| 2009/0228878 A1 * | 9/2009 | Katsaros et al. | .............. | 717/172 |
| 2009/0240483 A1 * | 9/2009 | Adams et al. | .................... | 703/15 |
| 2009/0300093 A1 * | 12/2009 | Griffiths et al. | ............... | 709/202 |
| 2010/0306319 A1 * | 12/2010 | Brzozowski | .................. | 709/206 |
| 2011/0047538 A1 * | 2/2011 | Chung et al. | ................... | 717/173 |
| 2011/0321024 A1 * | 12/2011 | Knothe et al. | ................. | 717/168 |
| 2012/0117555 A1 * | 5/2012 | Banerjee et al. | .............. | 717/168 |

OTHER PUBLICATIONS

Mockus et al., Predicting Risk of Software Changes, 2000.*

* cited by examiner

*Primary Examiner* — Wei Zhen
*Assistant Examiner* — Zhan Chen
(74) *Attorney, Agent, or Firm* — Dority & Manning, P.A.

(57) ABSTRACT

A system and machine-implemented method for handling an unexpected error associated with an application are disclosed. The subject disclosure provides for sending, from a client running a client application, an instruction to an application server hosting a server application associated with the client application, detecting an unexpected error in response to the sent instruction, automatically requesting, from the application server, an updated version of application code for the client application in response to the detected unexpected error, receiving the updated version of application code and updating the client application using the updated version of application code.

21 Claims, 4 Drawing Sheets

AUTOMATED APPLICATION UPDATE CHECKS BASED ON UNEXPECTED ERRORS AND CRASHES

CROSS-REFERENCE TO RELATED APPLICATIONS

The present application claims the benefit of priority under 35 U.S.C. §119 from U.S. Provisional Patent Application Ser. No. 61/613,425 entitled "AUTOMATED APPLICATION UPDATE CHECKS BASED ON UNEXPECTED ERRORS AND CRASHES," filed on Mar. 20, 2012, the disclosure of which is hereby incorporated by reference in its entirety for all purposes.

FIELD

The subject disclosure relates generally to increasing performance of user applications, and, in particular, to automated application update checks.

BACKGROUND

When application upgrades are created that change communication protocols or other aspects of an application, outdated client applications can malfunction and cause a degraded user experience. In conventional systems, an error or crash can be analyzed by a back-end application server, another application, or a third party server. Based on the analysis of the error or crash, a pre-selected patch corresponding to the analyzed error can be selected for the malfunctioning application to fix the problem. However, the cause of the error or crash is frequently misdiagnosed, and, while the error is being evaluated and a proper patch selected, the user's access to the application may be interrupted or restricted for extended periods of time.

It is, therefore, desirable to improve the currently available options to provide an improved process for handling application errors and crashes.

SUMMARY

Application code identifies errors either within the client or related to client-server communication. When an error occurs, such as a malformed server response due to a mismatch in communication protocols, any other kind of malformed response, or when there is an internal bug at the client, the client automatically requests from its application server an updated version of application code to see if the update will fix the problem or error. When an update to the application code is available, the application code automatically updates the running code or prompts the user to install the update to fix the error. The user has an immediate resolution and his experience is uninterrupted.

This could occur for any unexpected behavior, crashes, or other errors that go against expected behavior in the client. The exact nature of the error does not necessarily have to be known or analyzed. The client, upon encountering any unexpected error, immediately and automatically upgrades (when an upgrade is available) to a newer version of application code. Alternatively, the client may be redirected to an application store, when necessary.

The disclosed subject matter relates to a machine-implemented method for handling an unexpected error associated with an application and includes the steps of sending, from a client running a client application, an instruction to an application server hosting a server application associated with the client application, and detecting an unexpected error in response to the sent instruction. The method further includes automatically requesting, from the application server, an updated version of application code for the client application in response to the detected unexpected error, receiving the updated version of application code, and updating the client application using the updated version of application code.

The subject disclosure also relates to a machine-readable medium comprising instructions stored therein, which when executed by a machine, cause the machine to perform operations including, sending, from a client running a client application, an instruction to an application server hosting a server application associated with the client application, detecting an unexpected error from the application server, determining that the client application is outdated in response to the detected unexpected error and automatically requesting, from the application server, an updated version of application code for the client application in response to the received unexpected error. The operations further include, receiving the updated version of application code, updating the client application using the updated version of application code and sending the instruction to the application server running the application subsequent to updating the client application.

The disclosed subject matter further relates to a system comprising one or more processors and a machine-readable medium comprising instructions stored therein, which when executed by the processors, cause the processors to perform operations including, sending, from a client running a client application, an instruction to an application server hosting a server application associated with the client application, and detecting an unexpected error in response to the sent instruction. The operations further include automatically requesting, from the application server, an updated version of application code for the client application in response to the detected unexpected error, receiving the updated version of application code, and updating the client application using the updated version of application code.

The disclosed subject matter also relates to a machine-implemented method for handling an unexpected error associated with an application. The method includes the step of receiving, at an application server, an application instruction from a client running an application and processing the received application instruction. The method further includes detecting an unexpected error when processing the received application instruction, and automatically providing an updated version of application code for the application to the client, in response to detecting the unexpected error.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

For purpose of explanation, several embodiments of the subject technology are set forth in the following figures.

DETAILED DESCRIPTION

Figure 1:
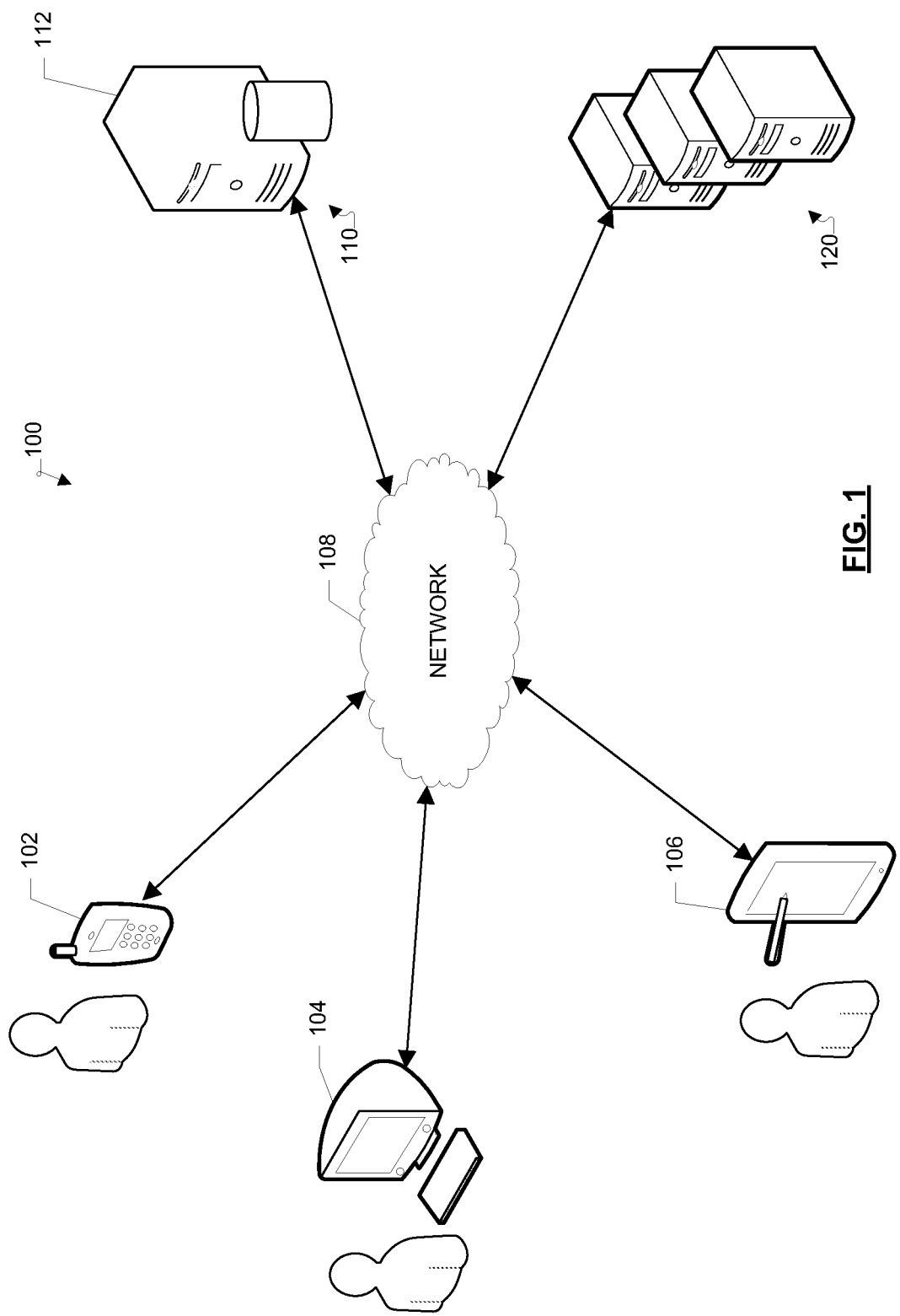
FIG. 1 illustrates an example client-server network environment which provides for automated application update checks based on unexpected errors and crashes.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

When a client device running an outdated version of an application communicates with a server hosting an updated version of the server software, it is possible for the application to crash on the client device or respond with an unexpected response or error. For example, there may be a mismatch in communication protocols between the client and the server due to server-side upgrades, or there may be feature deprecation on the client-side, causing the unexpected error or response. The present disclosure provides a system and method for handling an unexpected error associated with an application. The disclosed subject matter offers a solution to the above issue by providing a method for handling unexpected application errors or crashes that includes automatically requesting an application upgrade when an irregular response is encountered. In one aspect, an application running on a client device may send a request to its application server, and, upon receiving any unexpected response, including an application error or crash, re-load the application code. The application code may be reloaded in whole or in part, that is, some modules may be re-loaded while others are left in tact. An application code module may be replaced or updated without stopping the application, when the application code us not to be updated in its entirety, enabling the application to swap out a component without ceasing. As part of reloading the application on a client device, the user may be re-directed to the application back-end server or an application store to obtain the latest application version.

As such, any unexpected response from an application server will serve as a signal that application code is out of date and should be updated or otherwise reloaded. Upon receiving an unexpected response from an application server, a determination is made that the client is running an outdated version of the application, in response to detecting the unexpected error. An updated version of application code for the application is provided to the client, in response to the unexpected response. An application server may connect to its own back-end server, a third party server, or to an application store to check for and request an application code update. A user may be provided with a message asking him to confirm reloading the application code. Overall, the re-load occurs automatically and seamlessly for the user, thus improving the user's experience.

FIG. 1 illustrates an example client-server network environment which provides for automated application update checks based on unexpected errors and crashes. A network environment 100 includes a number of electronic devices 102, 104 and 106 communicably connected to a server 110 by a network 108. Server 110 includes a processing device 112 and a data store 114. Processing device 112 executes computer instructions stored in data store 114, for example, to host an application, or to determine whether one or more of electronic devices 102, 104 and 106 is running an outdated version of an application. Processing device 112 may further determine whether application code needs to be re-loaded in whole or in part. Processing device 112 may also determine whether an electronic device 102, 104, or 106 needs to be re-directed to a third party server or an application store to obtain the latest application version. Servers 120 may host such third-party servers or application stores.

In some example aspects, electronic devices or client devices, as used interchangeably herein, 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In the example of FIG. 1, electronic device 102 is depicted as a smartphone, electronic device 104 is depicted as a desktop computer, and electronic device 106 is depicted as a PDA. A client in an application or a system that accesses a service made available by a server which is often (but not always) located on another computer system accessible by a network. Some client applications may be hosted on a website, whereby a browser is a client. Such implementations are within the scope of the subject disclosure, and any reference to client may incorporate a browser and reference to server may incorporate a website.

In some example aspects, server 110 can be a single computing device such as a computer server. In other embodiments, server 110 can represent more than one computing device working together to perform the actions of a server computer (e.g., cloud computing). The server 110 may host the web server communicationally coupled to the browser at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
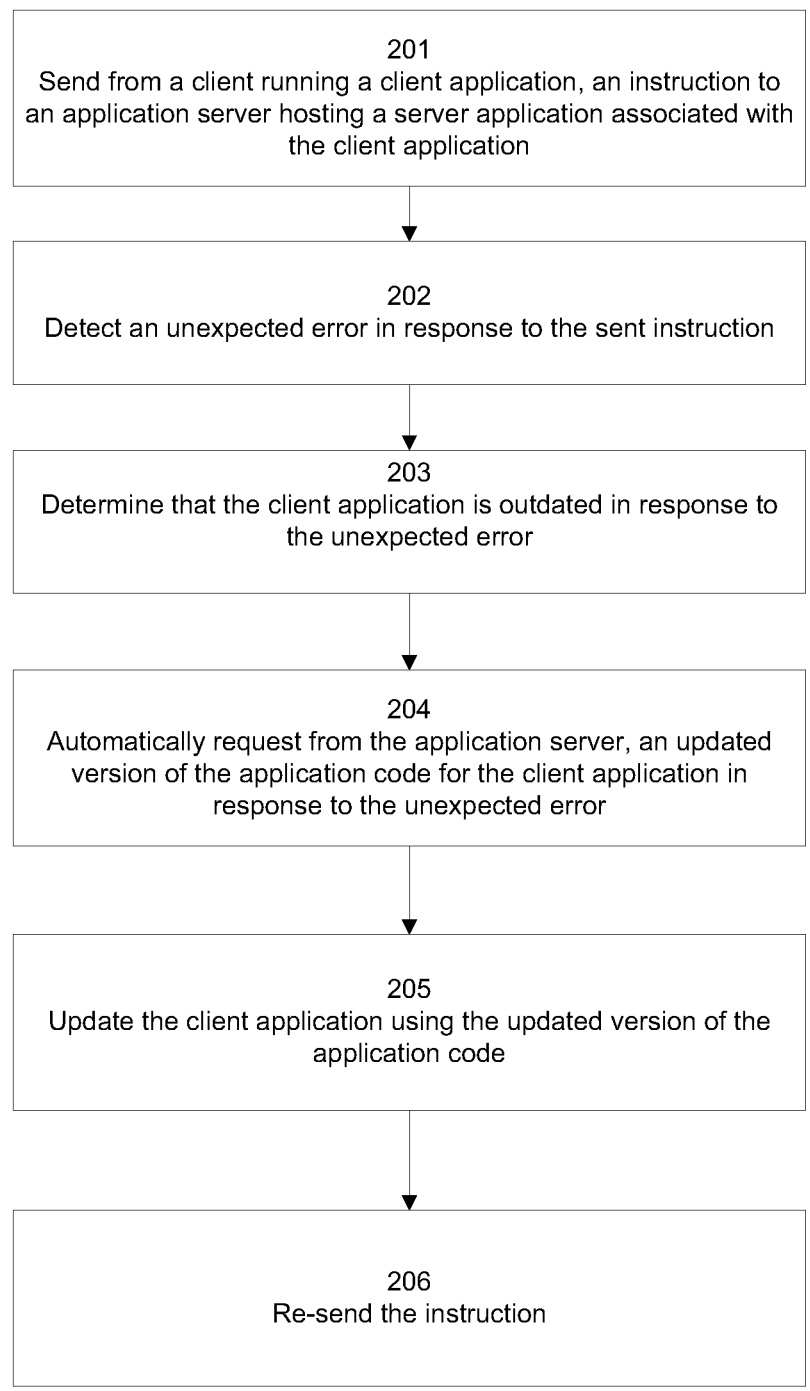
FIG. 2 illustrates a flow diagram of an example process for automated application update checks based on unexpected errors and crashes at an application client.

FIG. 2 illustrates a flow diagram of an example process 200 for application update checks based on unexpected errors and crashes at an application client. At block 201, an instruction to an application server hosting a server application associated with a client application is sent from a client running the client application. The instruction may correspond to any type of instruction. For example, the instruction may be an instruction to launch the application, to perform a process within the application, or another type of instruction. The client, as described herein, may be any device described with reference to FIG. 1 or any other device capable of sending and receiving electronic messages and running an application. At block

202, an unexpected error is detected in response to the sent instruction. Detecting the unexpected error may include receiving an error indication from the client, the application, or from the application server. Any unexpected response or error when processing the application instruction may be relevant for the step of detecting an unexpected error. An application crash may also be considered an unexpected response or error. When a communication protocol is updated at the application server, the request that is sent in block 201 may never make it to the application server, thus, the error or indication thereof would come from within the application or from the client. Otherwise, the unexpected error may come from the application server, for example. The unexpected error may be any error, an application crash, or a malformed or unexpected response from the application server. According to an aspect of the subject disclosure, a long delay in receiving a response may also be considered an unexpected error. Systems implementing the subject technology may define what constitutes a long delay based on system or business preferences or standards.

At block 203, the system may determine that the client application is outdated in response to the unexpected error. The determination may not need to be a separate step in the process, depending on implementation. It may be inferred from the unexpected error, that any unexpected error means that the client is running an outdated version of the application. Any unknown, unexpected, malformed response or application state may be treated as a signal that the application is not up to date, according to an aspect of the subject disclosure. To that end, the determination may be made on the client running the application or on the application server associated with the client application. If the latter occurs, the client may receive an indication from the application server that such a determination has been made.

At block 204, the process includes automatically requesting, from the application server, an updated version of application code for the client application in response to the unexpected error. To that end, it may be additionally determined, at the client or elsewhere, whether the application code needs to be updated in full or in part, that is, some modules may be re-loaded while others are left in tact. The right module or code segment may be selected using additional logic. For example, an application shell may manage the determinations regarding which segments of application code should be updated if the application code is not to be updated in its entirety.

Analysis may be performed to identify the smallest discrete segment or module of application code that can be updated to address the unexpected response or error. Additional logic may be implemented at the application server that may split updating the application code into zones, trees, or hierarchies. The logic may be set up to first select the smallest segment of application code to update, download it, re-process the received application instruction, and, if that did not cure the unexpected error, select the next, larger segment of application code to update. The application server may continue segment selection until the right size segment of application code was selected.

If a hierarchal approach were implemented, application code segments or modules may be selected based not on size but on other logic dealing with probability of a successful fix or another similar parameter. For example, an application shell may manage the determinations regarding which application code modules should be replaced when the application code is not to be updated in its entirety, enabling the application to swap out a component without ceasing. Because application code at application servers may frequently be updated or replaced, segments of application code may easily be swapped out because the code is often re-loaded at application servers in discrete modules. Depending on the original source of the application, some applications requiring payment may necessitate that the application client first be re-directed to an application store to gain access to updated application code and to, perhaps, pay for the updated version of the application, if necessary. A permission may first be requested from the user to be re-directed to the application store.

The request for an updated version of application code for the client application is made to the application server. Alternatively, the request may be made to an application store, when appropriate, or the request may be made to the application server and then transferred or otherwise submitted to the application store by the application server. Depending on the original source of the application, some applications requiring payment may necessitate that the application client first be re-directed to an application store to gain access to updated application code and to, perhaps, pay for the updated version of the application, if necessary. A permission may first be requested from the user to be re-directed to the application store.

Once the updated application code is identified and selected, if available, the client application is automatically updated using the requested updated version of application code at block 205. According to an aspect of the subject disclosure, application code is updated "in-line." The term "in-line" as used herein encompasses its plain and ordinary meaning, including, but not limited to, in the same application session in which the application instruction was sent from the client running the application, without ceasing the application. The updated modules containing interpreted code may be substituted for the outdated modules while the application is running, without having to close the application, or uninstall it. The instruction sent to the application server from the client running the application at block 201 may then be resent at block 206.

Figure 3:
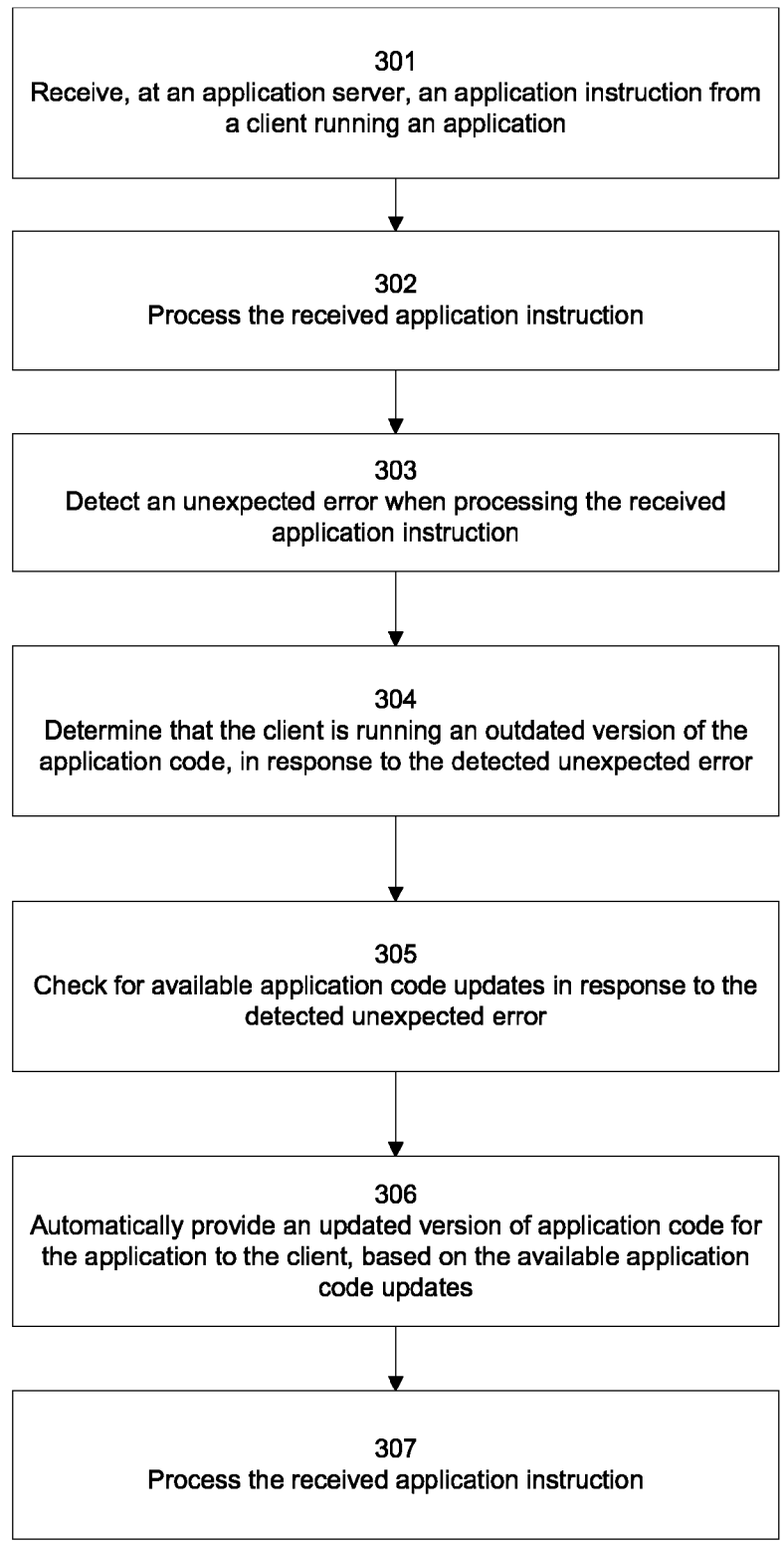
FIG. 3 illustrates a flow diagram of an example process for server-side automated application update checks based on unexpected errors and crashes.

FIG. 3 illustrates a flow diagram of an example process 300 for server-side automated application update checks based on unexpected errors and crashes. At block 301, an application instruction from a client device 102, 104 or 106 running the application is received at an application server such as server 110. The application instruction may correspond to any type of instruction. For example, the application instruction may be an instruction to launch the application, to perform a process within the application, or another type of instruction. At block 302, application server processes the received application instruction. At block 303, when processing the received application instruction, the application server detects an unexpected error. Any unexpected response or error when processing the application instruction may be relevant for the step of detecting an unexpected error. An application crash may also be considered an unexpected response or error.

At block 304, the application server may determine that the client is running an outdated version of the application, in response to the detected unexpected error. It is possible that the determination may not be a separate step in the process. The determination may be inferred from the unexpected error, in that any unexpected error means that the client is running an outdated version of the application. Any unknown, unexpected, malformed response or application state may be treated as a signal that the application is not up to date, according to an aspect of the subject disclosure.

In response to the unexpected error, the application server automatically checks for available application code updates at block 305. To that end, prior to selecting the appropriate updated version of application code, the application server may first determine whether the application code needs to be reloaded in full or in part, that is, some modules may be re-loaded while others are left in tact.

Once the available updated application code is identified and selected, at block 306, updated version of application code for the client or an updated segment of application code is automatically provided to the client based on the available application code updates. According to an aspect of the subject disclosure, the application code is downloaded from the application server hosting the application. Alternatively, the application client may be re-directed to an application store to check for, request, or receive an application code update. Once the application code is updated, the received instruction is processed again at step 307.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
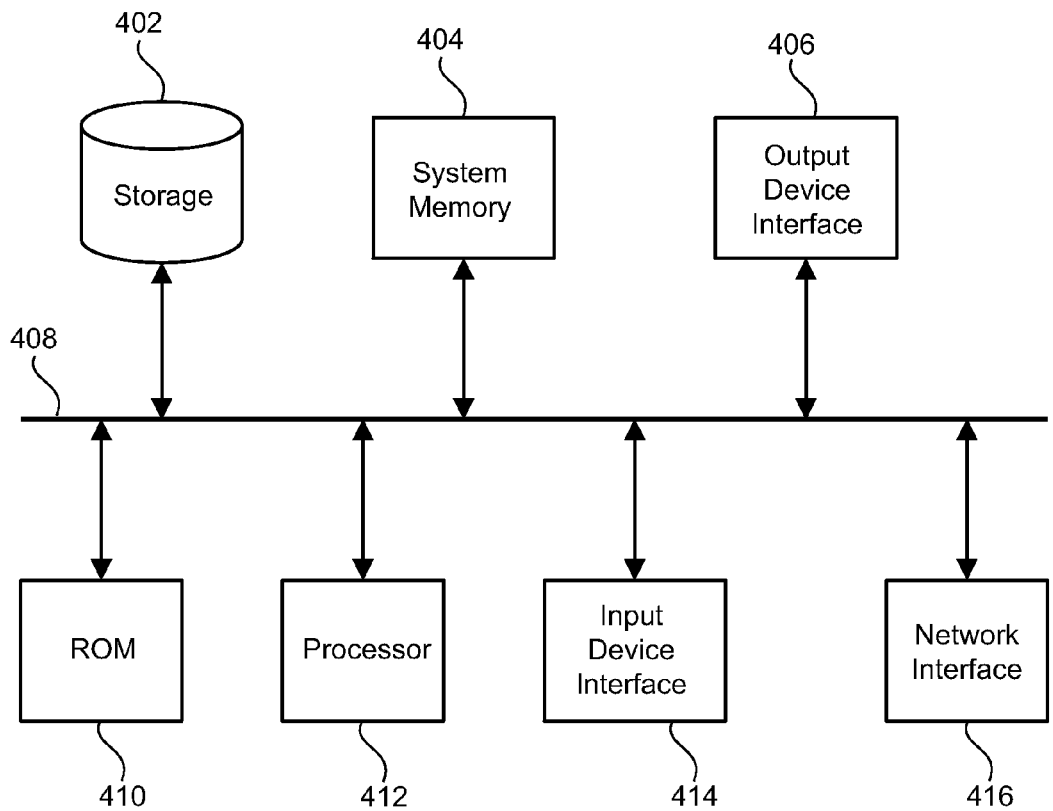
FIG. 4 conceptually illustrates an electronic system with which some aspects of the subject technology are implemented.

FIG. 4 conceptually illustrates an electronic system with which some aspects of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for handling an unexpected error associated with an application according to various embodiments. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. All structural and functional equivalents to the elements of the various aspects described throughout this disclosure that are known or later come to be known to those of ordinary skill in the art are expressly incorporated herein by reference.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for handling an unexpected error associated with an application, the method comprising:
    sending, from a client running a client application in an application session, an instruction to an application server hosting a server application associated with the client application;
    detecting an unexpected application error in response to the sent instruction;
    automatically requesting, from the application server, an updated version of application code for the client application in response to the detected unexpected application error;
    receiving the updated version of application code;
    identifying the smallest discrete module of the updated version of application code that can be updated to address the unexpected application error;
    updating the client application in the application session in which the instruction to the application server was sent from the client running the client application using the smallest discrete module of the updated version of application code, wherein access to the client application during the application session is uninterrupted by the updating the client application; and
    when updating the client application with the smallest discrete module of the updated version of application code did not cure the unexpected application error, selecting a next, larger segment of application code to update the client application, and continuing segment selection until the right size segment of application code is selected to address the unexpected application error.

2. The computer-implemented method of claim 1, further comprising:
    determining that the client application is outdated in response to the detected unexpected application error.

3. The computer-implemented method of claim 2, wherein determining that the client application is outdated in response to the detected unexpected application error includes receiving, from the application server, an indication of a determination that the client application is outdated.

4. The computer-implemented method of claim 1, further comprising:
    sending the instruction to the application server running the application subsequent to updating the client application.

5. The computer-implemented method of claim 1, wherein updating the client application using the updated version of application code includes requesting user permission to update the application code.

6. The computer-implemented method of claim 1, wherein receiving the updated version of application code includes receiving the updated version of application code from the application server.

7. The computer-implemented method of claim 1, wherein receiving the updated version of application code includes receiving the updated version of application code from an application store.

8. The computer-implemented method of claim 7, wherein receiving the application code update from the application store further comprises:
    requesting user permission to receive the application code update from the application store.

9. The computer-implemented method of claim 1, wherein updating the client application using the updated version of application code includes updating application code segments.

10. The computer-implemented method of claim 1, wherein updating the client application in the application session in which the instruction to the application server was sent from the client running the application using the updated version of application code comprises updating the client application in the application session without the application session ceasing.

11. The computer-implemented method of claim 1, wherein the instruction sent to the application server hosting the server application associated with the client application is not a request for the updated version of the application code.

12. The computer-implemented method of claim 1, wherein the instruction sent to the application server hosting the server application associated with the client application comprises an instruction to launch the client application, or to perform a process within the client application.

13. The computer-implemented method of claim 1, further comprising using an application shell to manage the determinations regarding which discrete modules of the updated version of application code should be replaced when the application code is not to be updated in its entirety, enabling the client application to be updated without the application session being interrupted.

14. A non-transitory machine-readable medium comprising instructions stored therein, which when executed by a machine, cause the machine to perform operations comprising:
    sending, from a client running a client application in an application session, an instruction to an application server hosting a server application associated with the client application;
    detecting an unexpected application error from the application server;
    determining that the client application is outdated in response to the detected unexpected application error;
    automatically requesting, from the application server, an updated version of application code for the client application in response to the detected unexpected application error;
    receiving the updated version of application code;
    identifying the smallest discrete module of the updated version of application code that can be updated to address the unexpected application error;
    updating the client application in the application session in which the instruction to the application server was sent from the client running the client application using the smallest discrete module of the updated version of application code, wherein access to the client application during the application session is uninterrupted by the updating the client application;

when updating the client application with the smallest discrete module of the updated version of application code did not cure the unexpected application error, selecting a next, larger segment of application code to update the client application, and continuing segment selection until the right size segment of application code is selected to address the unexpected application error; and sending the instruction to the application server running the application subsequent to updating the client application.

15. The non-transitory machine-readable medium of claim 14, wherein determining that the client application is outdated in response to the detected unexpected application error includes receiving, from the application server, an indication of a determination that the client application is outdated.

16. The non-transitory machine-readable medium of claim 14, wherein updating the client application using the updated version of application code includes requesting user permission to update the application code.

17. The non-transitory machine-readable medium of claim 14, wherein receiving the updated version of application code includes receiving the updated version of application code from the application server.

18. The non-transitory machine-readable medium of claim 14, wherein receiving the updated version of application code includes receiving the updated version of application code from an application store.

19. The non-transitory machine-readable medium of claim 18, wherein receiving the application code update from the application store further comprises:

requesting user permission to receive the application code update from the application store.

20. The non-transitory machine-readable medium of claim 14, wherein updating the client application using the updated version of application code includes updating application code segments.

21. A system for handling an unexpected error associated with an application, the system comprising:

one or more processors; and a machine-readable medium comprising instructions stored therein, which when executed by the processors, cause the processors to perform operations comprising:

sending, from a client running a client application in an application session, an instruction to an application server hosting a server application associated with the client application;

detecting an unexpected application error from the application server;

automatically requesting, from the application server, an updated version of application code for the client application in response to the detected unexpected application error;

receiving the updated version of application code; and identifying the smallest discrete module of the updated version of application code that can be updated to address the unexpected application error;

updating the client application in the application session in which the instruction to the application server was sent from the client running the client application using the smallest discrete module of the updated version of application code, wherein access to the client application during the application session is uninterrupted by the updating the client application; and when updating the client application with the smallest discrete module of the updated version of application code did not cure the unexpected application error, selecting a next, larger segment of application code to update the client application, and continuing segment selection until the right size segment of application code is selected to address the unexpected application error.

* * * * *